Aug. 8, 1961 — E. G. HULTGREN — 2,994,921
MOLDING DEVICE

Filed April 15, 1960 — 3 Sheets-Sheet 2

INVENTOR
Eric G. Hultgren
ATTORNEYS

Aug. 8, 1961 E. G. HULTGREN 2,994,921
MOLDING DEVICE

Filed April 15, 1960 3 Sheets-Sheet 3

INVENTOR.
Eric G. Hultgren
BY
Johnson and Kline
ATTORNEYS

United States Patent Office 2,994,921
Patented Aug. 8, 1961

2,994,921
MOLDING DEVICE
Eric G. Hultgren, Bridgeport, Conn., assignor to United Tool Company, Bridgeport, Conn., a partnership
Filed Apr. 15, 1960, Ser. No. 22,451
10 Claims. (Cl. 18—42)

The present invention relates to an improved molding device and particularly to means for removing a molded article from the mold.

Heretofore, in molding articles, particularly cylindrical articles such as parts of lipstick cases, one of the mold parts has been provided with knockout pins which are normally retained in a retracted position and which, after the molding operation, are projected to eject the piece from the mold.

These have presented problems in that their presence in the mold tends to produce a mark on the molded piece and there is also a tendency to slightly deform the soft molding material at the point of contact during the ejection of the article to produce a flat on the article. Also, since they are projected into the mold cavity they have caused damage to the mold when they have been stuck in projected position and the molds closed.

The present invention overcomes these difficulties by providing a molding device for molding hollow articles in which knockout pins are eliminated and is particularly useful in the injection molding of articles such as lipstick cases.

This is accomplished by providing means for mounting the core pin which is projected into the mold cavity to form hollow articles therein in such a manner that the core pin sequentially removes the article from the cavities of each part of the mold forming the molding cavity and thereafter is retracted to strip the molded article from the core pin.

Further, the invention provides means for securely holding the core pin in position during the molding operation and relieves the pressure thereby on the molded article immediately upon the initial separation of the mold parts.

Other features and advantages of the invention will be apparent from the specification and claims when considered in connection with the accompanying drawings in which:

FIG. 7 is an enlarged sectional view of the mold cavity with the core pin in position.

FIGS. 8 and 9 are front and back views of the molded article.

Figure 1:
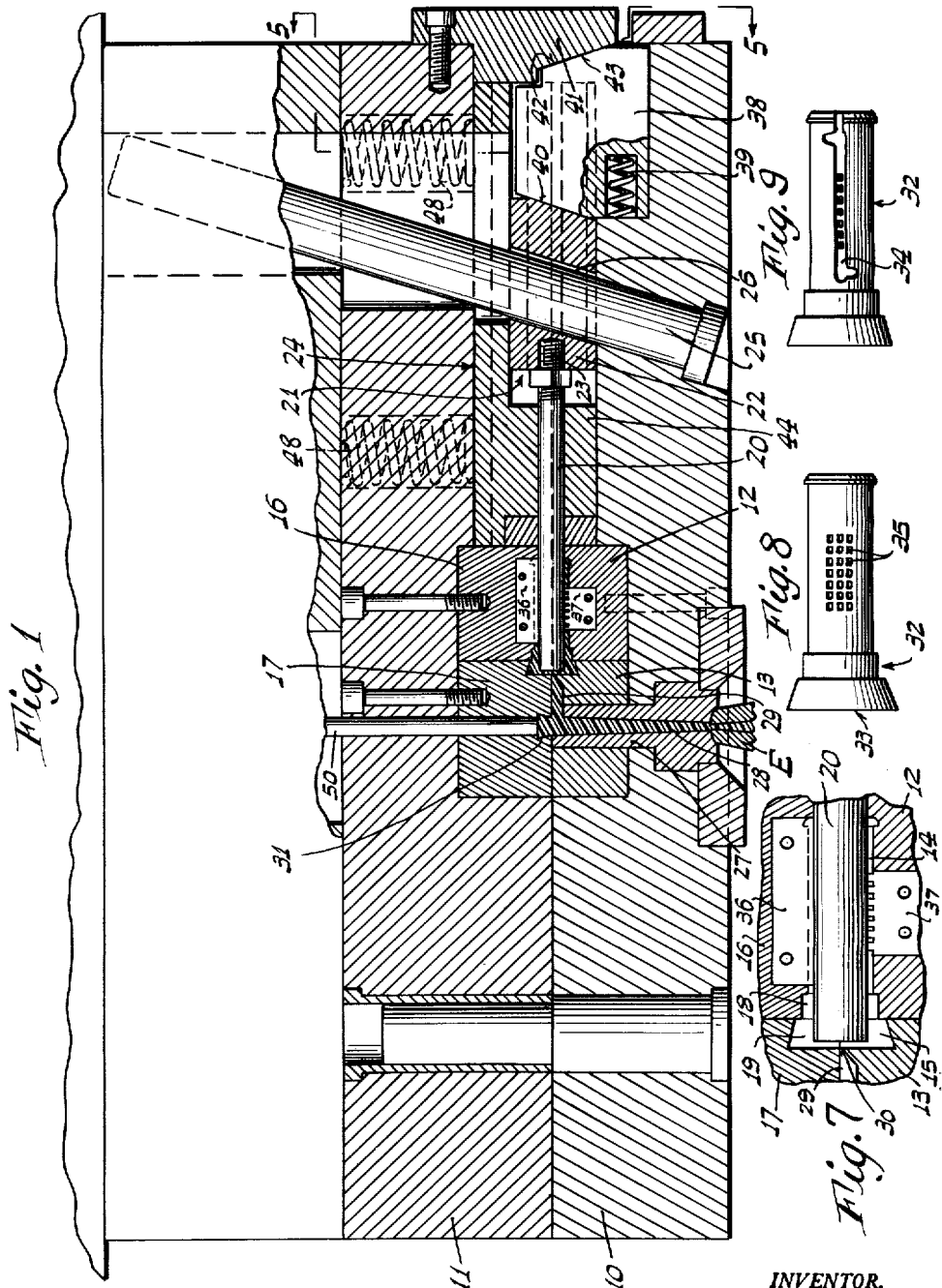
FIGURE 1 is a view, partly in section, of the molding means of the present invention in molding position.

While the present invention may be used in various molding devices, it is illustrated as being applied to an injection molding device. Although the mold may have a plurality of cavities, for the purpose of simplifying the explanation of the invention, the description will be directed to a single cavity.

As shown in the drawings, the mold comprises a fixed mold part 10 and a movable mold part 11. The fixed mold part has inserted therein and secured thereto a pair of blocks 12, 13 terminating in the meeting face thereof. The blocks have cavities 14, 15 opening in the meeting face of the mold. The upper mold has a pair of blocks 16, 17 inserted therein and secured thereto and terminating in the meeting face thereof. The blocks have cavities 18, 19 in the meeting face of the mold part.

With the mold parts in molding position as shown in FIG. 1, the blocks are in engagement and the cavities therein form the molding cavity for molding an article from a suitable thermoplastic material such as polystyrene or the like resins.

A core pin 20 is disposed so as to lie in the plane of the meeting faces of the mold parts and is mounted on a core pin mounting means 21 carried by the mold for reciprocation into and out of the mold cavity in order to mold hollow articles in the mold cavity.

In the illustrated form of the invention the core pin mounting means comprises a carrier 22 to which the core pin is adjustably secured by threads 23 and which is slidable on a mounting means 24 carried by the movable mold part. While the carrier and core pin can be reciprocated by fluid pressure or electrical means, it is at present preferred to move the core pin mechanically as an incident to the opening and closing of the mold. For this purpose an inclined cam rod 25 is secured to the fixed mold part and passes through an aperture 26 in the carrier in such a manner that as the mold parts are moved to closed position the core pin will be projected into the mold cavity by the movement of the carrier along the cam rod and will be retracted by said relative movement of the carrier and cam rod as the mold parts move to open position.

Figure 2:
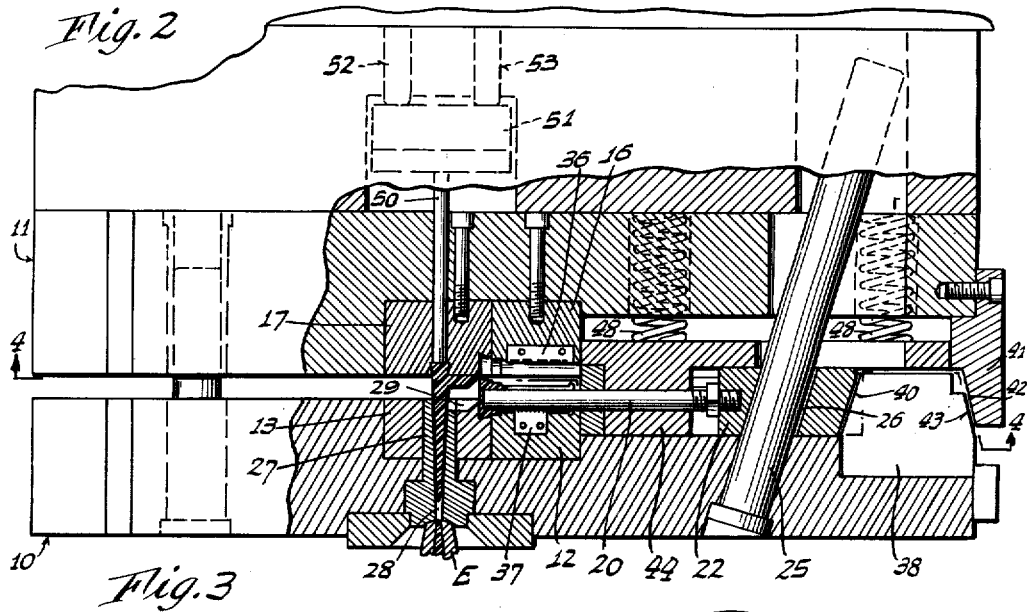
FIG. 2 is a view similar to FIG. 1 showing the mold during the initial opening thereof.
Figure 3:
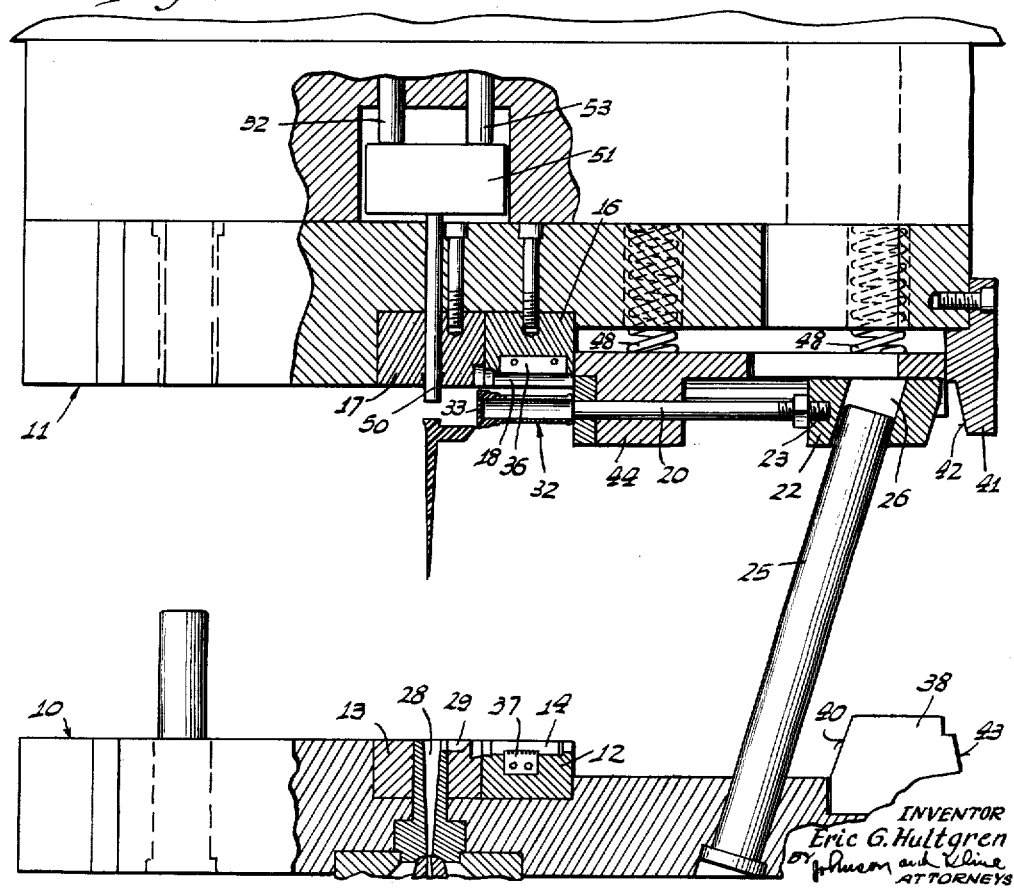
FIG. 3 is a view similar to FIG. 1 showing the mold in open position.
Figure 4:
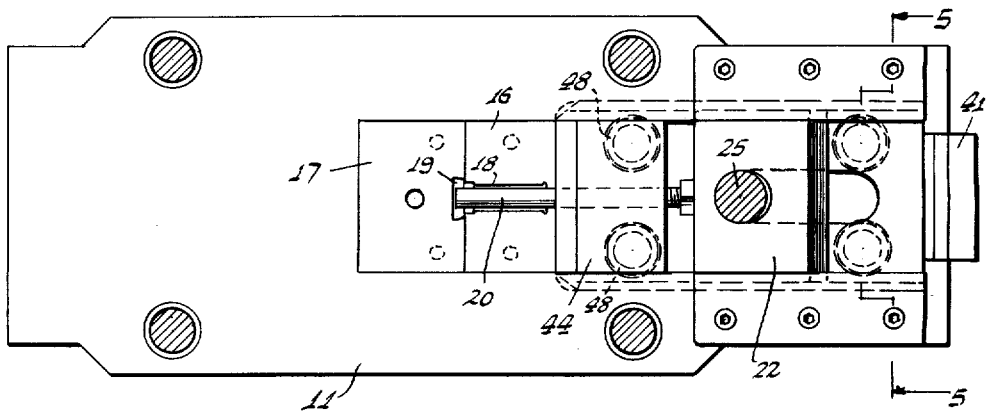
FIG. 4 is a view of the movable mold part taken along line 4—4 of FIG. 2.

As shown in FIGS. 1–3, insert block 13 in the fixed mold part has a sleeve 27 mounted therein and provided with a tapered gate passage 28 leading from an extruder head E to a lateral passage 29 communicating with an opening 30 in the bottom of the cavity and insert block 17 in the movable mold part is provided with a recess 31 forming an extension of the tapered gate passage which receives the material and forms a part of the gate which is interlocked with the movable mold part for movement as the movable mold part moves to open position after the plastic has been forced into the mold through the gate passage and aperture.

As shown in FIGS. 1 and 7, the core pin in its projected position terminates short of the end of the cavity to form an article 32 having a closed end 33. The article as shown in FIGS. 8 and 9 is a base member for a lipstick case and has a slot 34 in one side and a group of breather apertures 35 in the opposite side. These are formed by inserts 36 and 37 which are secured in insert blocks 12 and 16 to extend into the mold cavity. As shown in FIG. 7, the inserts not only form the slot and apertures in the article but also engage the core pin intermediate its length and support it against lateral shifting under molding pressures.

Means are also provided on the mold for blocking the core pin in its projected position in the mold to prevent rearward displacement thereof as the plastic material is forced into the mold. In the illustrated form of the invention this comprises a blocking member 38 slidably mounted on the fixed mold and normally urged to a retracted position by spring means 39, the blocking member having a face 40 adapted to engage the back of the carrier when the core pin is in molding position in the mold. The movable mold has a cooperating portion 41 provided with an inclined face 42 to engage the back inclined face 43 of the blocking member as the mold is closed to move the blocking member against the spring and hold the core pin in position. However, upon initial movement of the mold to open position, the face 42 on the movable mold moves out of engagement with face 43 and releases the pressure on the blocking member. The spring means 39 urges the blocking member to retracted position so as to immediately relieve pressure of the core pin on the bottom of the article as the mold opens.

In order to remove the molded article from the mold cavity without the use of knockout pins and the like, the present invention provides a novel arrangement whereby the core pin removes the article from the mold after which the article is stripped from the core pin.

Figure 5:
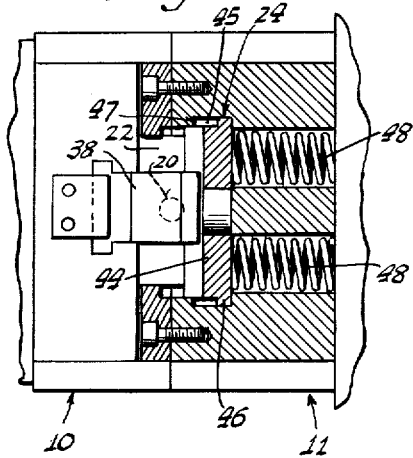
FIG. 5 is a sectional view taken along line 5—5 of FIG. 4 with the mold closed.
Figure 6:
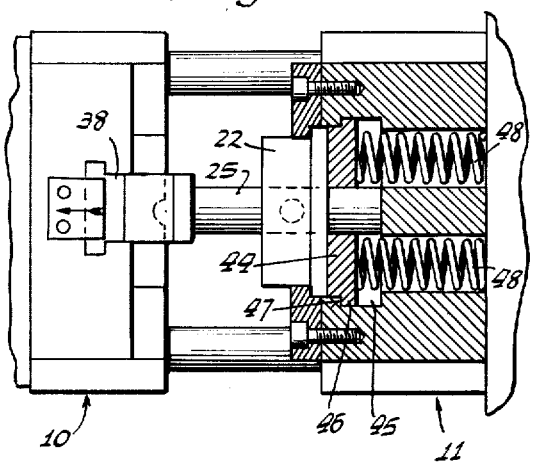
FIG. 6 is a view similar to FIG. 5 with the mold open.

This is accomplished by securing the mounting means for the core pin carrier on the movable mold part for limited relative movement with respect thereto. As shown in FIGS. 5 and 6, the mounting means 24 comprises a slide 44 which is slidably mounted in a recess 45 in the meeting face of the movable die and is provided with flanges 46 to engage shoulders 47 at the outer end of the recess to limit the outward movement of the mounting means. The mounting means is normally urged to a projected position, as shown in FIG. 6, by springs 48 or other suitable means. When the movable mold part 11 is moved into closed position, as shown in FIGS. 1 and 5, the springs are compressed and the slide moves relative to the mold part to a retracted position. During the initial movement of the movable mold part to open position, the slide with the core pin supported thereon will be retained in contact with the fixed mold part under the action of the springs 48. This results in relative movement between the movable mold part and core pin which causes the molded article to be removed from the cavities 18, 19 and insert 36 in the movable mold part as shown in FIG. 2. Also, the initial movement of the movable mold part causes the gate, which is interlocked therewith, to move outwardly with respect to the article held by the core pin so as to shear off the gate from the molded article.

Continued movement of the movable mold part causes the flanges 46 to engage the shoulder 47 whereupon the slide moves with the mold part and moves the core pin with respect to the fixed mold part. This will cause the article to be removed from the cavity of the fixed mold part and the insert 37. Also, the relative movement of the mounting means 24 and fixed mold part will cause the carrier for the core pin to cooperate with the cam rod on the fixed mold part to move the core pin to retracted position, as shown in FIG. 3, whereby the article is stripped from the core pin.

With this construction it will be seen that as the two mold parts are moved to closed position the core pin will be projected and positioned in the mold cavity immediately prior to the closing of the cavity and the engagement thereof by the inserts 36, 37.

While the gate can be removed from its interlocked relation with the movable mold part by hand, it is at present preferred to provide an ejector means comprising a pin 50 slidable in insert block 17 in the movable mold part to automatically engage the gate and free it from its interlocked relation. The ejector may be operated by various means. As herein illustrated the pin is provided with a head 51 at its inner end adapted to engage fixed pins 52, 53 in the machine as the movable mold part moves to open position. This will move the ejector pin outwardly, as shown in FIG. 3, to eject the gate as a separate element at the same time that the article is being discharged. By this time the article is sufficiently solidified so that it will not be deformed when it is ejected and a smooth mar-free finish is obtained.

Variations and modifications may be made within the scope of the claims and portions of the improvements may be used without others.

I claim:

1. A device for molding articles from plastic material comprising a mold having at least two mold parts movable between open to closed positions and provided with cavities in the meeting faces thereof cooperating in closed position to form a molding cavity, a core pin, core pin mounting means mounting the core pin on the mold in the plane of the meeting faces for reciprocating movement into and out of the cavity whereby hollow articles may be formed in said cavity, means resiliently mounted on one mold part for limited relative movement with respect thereto for mounting the core pin mounting means for movement in a plane perpendicular to the meeting faces and relative to said mold parts whereby upon separation of the mold parts the core pin removes the molded article from the cavities of the mold parts, and means operable thereafter for retracting the core pin from the article whereby the article is removed without the use of knockout pins.

2. A device for molding articles from plastic material comprising a mold having at least two separable mold parts movable between open to closed positions and provided with cavities in the meeting faces thereof cooperating in closed position to form a molding cavity, a core pin, core pin mounting means mounting the core pin on the mold in the plane of the meeting faces for reciprocating movement into and out of the cavity whereby hollow articles may be formed in said cavity, means mounting the core pin mounting means for limited relative movement with one of said mold parts whereby upon separation of the mold parts the core pin removes the molded article from the cavity of said mold part, said mounting means including means for thereafter stopping the relative movement thereof with respect to the first-mentioned mold part after said limited movement and for moving the mounting means with said mold part whereby the core pin removes the molded article from the cavity of the other mold part upon continued movement of said first-mentioned mold part, and means connecting the first-mentioned mold part and core pin mounting means for retracting the core pin from the article upon relative movement between said first-mentioned mold part and core pin mounting means to strip the article from the core pin.

3. A device for molding articles from plastic material comprising a mold having at least two separable mold parts movable between open to closed positions and provided with cavities in the meeting faces thereof cooperating in closed position to form a molding cavity, a core pin, core pin mounting means mounting the core pin on the mold in the plane of the meeting faces for reciprocating movement into and out of the cavity whereby hollow articles may be formed in said cavity, mounting means mounting the core pin mounting means on the face of one of said mold parts for relative movement with respect thereto, resilient means maintaining said mounting means in contact with the other mold part and causing relative movement with respect to the first-mentioned mold part during initial movement thereof to open position whereby the core pin removes the molded article from the cavity of the first-mentioned mold part, said mounting means including means for thereafter stopping relative movement thereof with respect to the first-mentioned mold part whereby continued movement of said first-mentioned mold part causes the core pin to remove the article from the cavity of the other mold part, and means controlling the core pin mounting means for thereafter retracting the core pin from the article to strip the article from the core pin.

4. A device for molding articles from plastic comprising a mold having a fixed mold part and a movable mold part, means moving said movable mold part into and out of engagement with said fixed mold part, said mold parts being provided with cooperating cavities in the meeting faces thereof to form a molding cavity, a core pin, core pin mounting means mounting the core pin in the mold to lie in the plane of the meeting faces for reciprocating movement into and out of the cavity whereby hollow articles may be formed in said cavity, means mounting the core pin mounting means on the movable mold part for limited movement with respect thereto during initial movement of the movable mold part whereby the core pin removes the molded article from the cavity of the movable mold part, said means including means for thereafter stopping relative movement thereof with respect to the movable mold part whereby the core pin removes the molded article from the cavity of the fixed mold part upon continued movement of the movable mold part, and means for retracting the core pin from the article after the article is removed from the fixed mold part to strip the article from the core pin.

5. A device for molding articles from plastic comprising a mold having a fixed mold part and a movable mold part, means moving said movable mold part into and out of engagement with said fixed mold part, said mold parts being provided with cooperating cavities in the meeting faces thereof to form a molding cavity, a core pin, core pin mounting means mounting the core pin in the mold to lie in the plane of the meeting faces for reciprocating movement into and out of the cavity whereby hollow articles may be formed in said cavity, means mounting the core pin mounting means on the movable mold part for limited movement with respect thereto during initial movement of the movable mold part whereby the core pin removes the molded article from the cavity of the movable mold part, said means including means for thereafter stopping relative movement thereof with respect to the movable mold part whereby the core pin removes the molded article from the cavity of the fixed mold part upon continued movement thereof, and cam means connected to the fixed mold part and acting upon the core pin mounting means in response to relative movement of the mold part and mounting means for retracting the core pin from the article to strip the article from the core pin.

6. In an injection molding device for molding articles from plastic material, a mold having a fixed mold part and a movable mold part, means moving said movable mold part into and out of engagement with said fixed mold part, said mold parts being provided with cooperating cavities in the meeting faces thereof to form a molding cavity, a gate passage in the fixed mold for supplying plastic material to the molding cavity, a core pin, core pin mounting means mounting the core pin in the mold to lie in the plane of the meeting faces for reciprocating movement into and out of the cavity whereby hollow articles may be formed in said cavity, means mounting the core pin mounting means on the movable mold part for limited movement with respect thereto during initial movement of the movable mold part whereby the core pin removes the molded article from the cavity thereof, said means including means for thereafter stopping relative movement of the core pin mounting means with respect to the movable mold part whereby the core pin removes the molded article from the cavity of the fixed mold part upon continued movement thereof, and means connecting the fixed mold part and core pin mounting means for retracting the core pin from the article upon relative movement therebetween to strip the article from the core pin.

7. In an injection molding device for molding articles from plastic material, a mold having a fixed mold part and a movable mold part, means moving said movable mold part into and out of engagement with said fixed mold part, said mold parts being provided with cooperating cavities in the meeting faces thereof to form a molding cavity, a gate passage in the fixed mold for supplying plastic material to one end of the molding cavity, the movable mold having an extension of the gate passage for interlocking the gate formed therein to the movable mold, a core pin, core pin mounting means mounting the core pin in the mold to lie in the plane of the meeting faces for reciprocating movement into and out of the other end of the cavity whereby hollow articles may be formed in said cavity, means mounting the core pin mounting means on the movable mold part for limited movement with respect therto during initial movement of the movable mold part whereby the core pin removes the molded article from the cavity thereof and the mold part withdraws the gate and breaks the gate from the article, said means including means for thereafter stopping relative movement of the mounting means with respect to the movable mold part whereby the core pin removes the molded article from the cavity of the movable mold part upon continued movement thereof, ejector means carried by the movable mold part for engaging the gate and releasing the interlock with said movable mold part, and means controlling the core pin mounting means for retracting the core pin from the article after removal of the article from the cavity by the core pin to strip the article from the core pin.

8. In an injection molding device for molding articles from plastic material, a mold having a fixed mold part and a movable mold part, means moving said movable mold part into and out of engagement with said fixed mold part, said mold parts being provided with cooperating cavities in the meeting faces thereof to form a molding cavity, a gate passage in the fixed mold for supplying plastic material to one end of the molding cavity, the movable mold having an extension of the gate passage for interlocking the gate formed therein to the movable mold, a core pin, core pin mounting means mounting the core pin in the mold to lie in the plane of the meeting faces for reciprocating movement into and out of the other end of the cavity whereby hollow articles may be formed in said cavity, blocking means engaging the core pin mounting means when the mold parts are closed to prevent retracting movement of the core pin as the material is injected into the mold, said blocking means releasing the blocking and relieving pressure of the core pin on the article upon initial movement of the mold part to open position, means mounting the core pin mounting means on the movable mold part for limited movement with respect thereto during initial movement of the movable mold part whereby the core pin removes the molded article from the cavity thereof and the mold part withdraws the gate and breaks the gate from the article, said means including means for thereafter stopping relative movement thereof with respect to the movable mold part whereby the core pin removes the molded article from the cavity of the fixed mold part upon continued movement thereof, and means controlling the movable mold part and core pin mounting means for retracting the core pin from the article upon removal of the article from the cavity by the core pin to strip the article from the core pin.

9. In an injection molding device for molding articles from plastic material, a mold having a fixed mold part and a movable mold part, means moving said movable mold part into and out of engagement with said fixed mold part, said mold parts being provided with cooperating cavities in the meeting faces thereof to form a molding cavity, a gate passage in the fixed mold for supplying plastic material to one end of the molding cavity, a core pin, core pin mounting means mounting the core pin in the mold to lie in the plane of the meeting faces for reciprocating movement into and out of the other end of the cavity whereby hollow articles may be formed in said cavity, blocking means engaging the core pin when the mold parts are closed to prevent retracting movement of the core pin as the material is injected into the mold, said blocking means comprising a blocking member slidable on the fixed mold and normally urged by urging means to retracted position and having a face to engage the back of the core pin mounting means, and means on the movable mold part to engage the member when the mold part is in closed position and hold the face in contact with the core pin mounting means against the action of the urging means, the means on the movable mold releasing and relieving pressure of the core pin upon movement of the mold part to open position.

10. In an injection molding device for molding articles from plastic material, a mold having a fixed mold part and a movable mold part, means moving said movable mold part into and out of engagement with said fixed mold part, said mold parts being provided with cooperating cavities in the meeting faces thereof to form a molding cavity, a gate passage in the fixed mold for supplying plastic material to one end of the molding cavity, the movable mold having an extension of the gate passage for interlocking the gate formed therein to the movable mold, a core pin, core pin mounting means mounting the core pin in the mold to lie in the plane of the meeting faces for reciprocating movement into and out of the other end of the cavity whereby hollow articles may be formed in said cavity, blocking means engaging the core pin mounting means when the mold parts are closed to prevent retracting movement of the core pin as the material is injected into the mold, said blocking means being released and relieving pressure on the pin upon movement of the mold part to open position, means mounting the core pin mounting means on the movable mold part for limited movement with respect thereto during initial movement of the movable mold part whereby the core pin removes the molded article from the cavity thereof and the mold part withdraws the gate and breaks the gate from the article, said means including means for thereafter stopping relative movement thereof with respect to the movable mold part whereby the core pin removes the molded article from the cavity of the fixed mold part upon continued movement thereof, ejector means carried by the movable mold part for engaging the gate and releasing the interlock with said movable mold part, and means controlling the movable mold part and core pin mounting means for retracting the core pin from the article after removal of the article from the cavity by the core pin to strip the article from the core pin.

References Cited in the file of this patent

UNITED STATES PATENTS

| | | |
|---|---|---|
| 2,421,058 | Eckstein | May 27, 1947 |
| 2,477,368 | Gits | July 26, 1949 |
| 2,558,027 | Wilson | June 26, 1951 |
| 2,587,070 | Spillman | Feb. 26, 1952 |
| 2,683,899 | Reichenbach | July 20, 1954 |
| 2,718,032 | Harvey | Sept. 20, 1955 |
| 2,783,502 | Abplanap | Mar. 5, 1957 |

FOREIGN PATENTS

| | | |
|---|---|---|
| 1,045,639 | Germany | Dec. 4, 1958 |